No. 771,106.

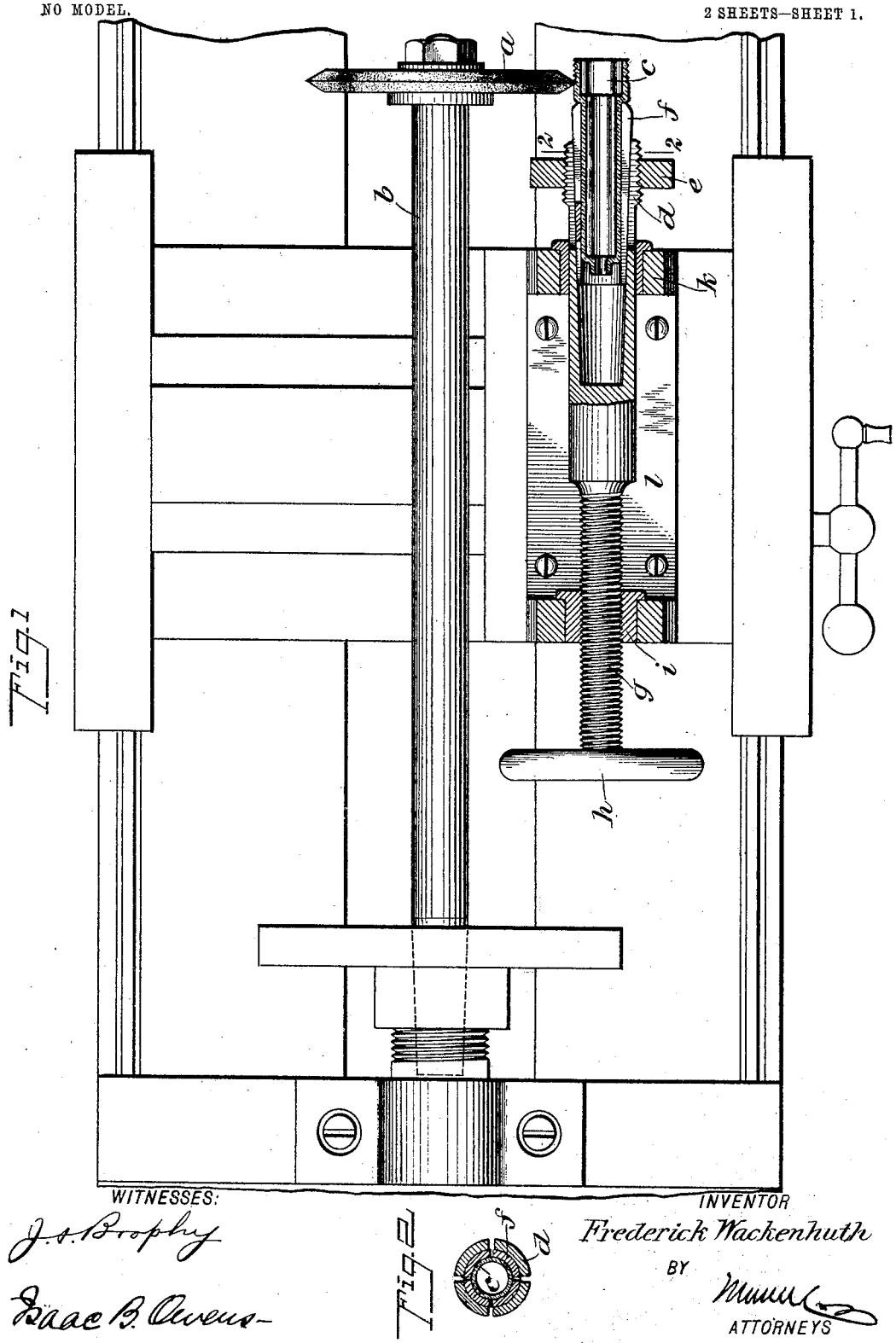

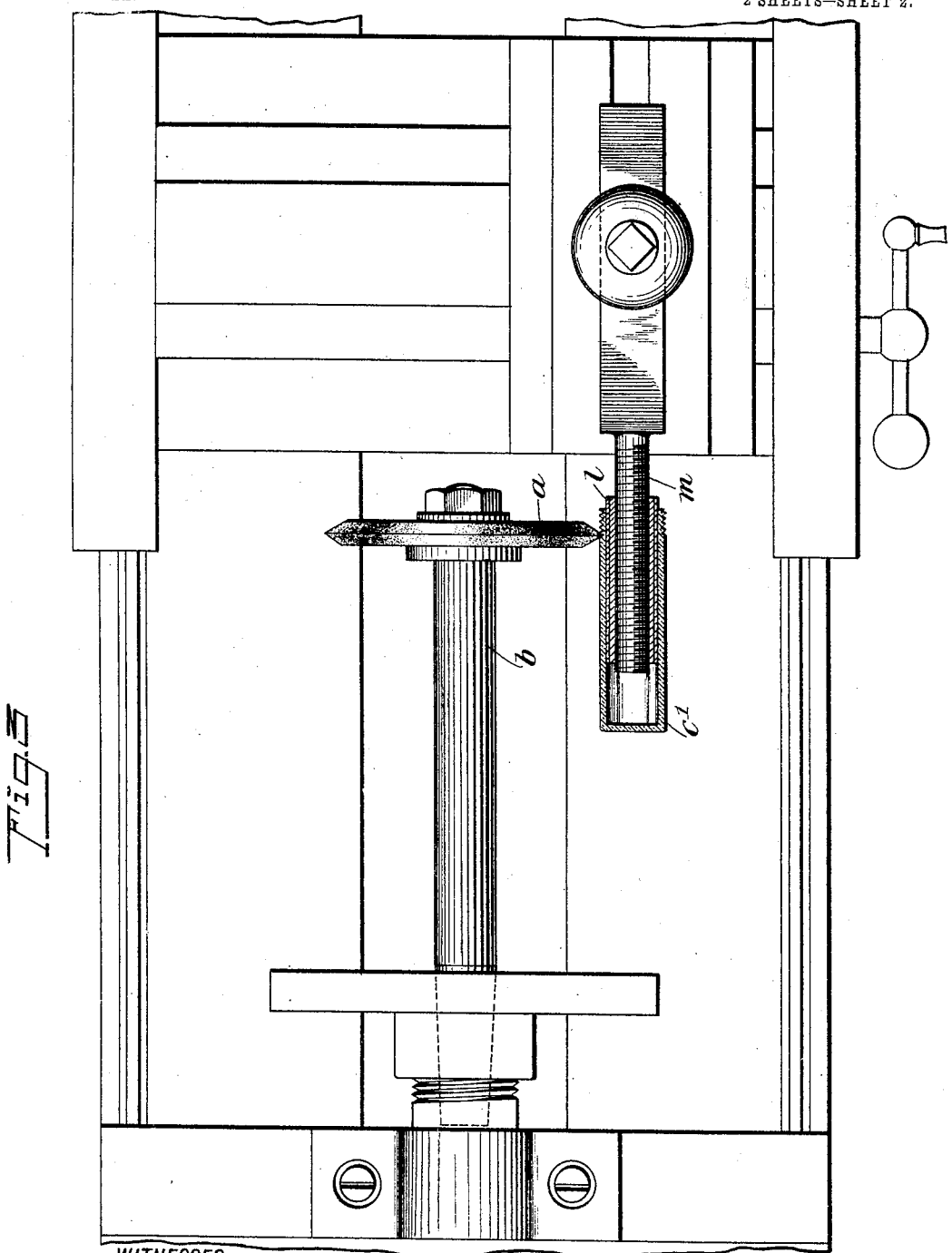

Patented September 27, 1904.

UNITED STATES PATENT OFFICE.

FREDERICK WACKENHUTH, OF NEW YORK, N. Y.

APPARATUS FOR FORMING THREADS ON GLASS.

SPECIFICATION forming part of Letters Patent No. 771,106, dated September 27, 1904.

Application filed October 28, 1903. Serial No. 178,853. (No model.)

*To all whom it may concern:*

Be it known that I, FREDERICK WACKENHUTH, a citizen of the United States, and a resident of the city of New York, borough of Manhattan, in the county and State of New York, have invented a new and Improved Apparatus for Forming Threads on Glass, of which the following is a full, clear, and exact description.

This invention relates to an apparatus for forming screw-threads of any desired pitch and form on glass cylinders, rods, and other round objects. Owing to the nature of glass and to the consequent difficulty of forming the same, this operation has never been successfully performed prior to my invention. I have discovered, however, that by providing a tool in the form of a disk composed of a homogeneous substance sufficiently hard to cut or grind into the glass, by driving this tool revolubly at a high rate of speed, and by feeding the work against the periphery of the tool I am enabled accurately and effectively to form a thread of any desired sort around the surface of the work.

This specification is an exact description of several forms of my invention, while the claims define the actual scope thereof.

Reference is to be had to the accompanying drawings, forming a part of this specification, in which similar characters of reference indicate corresponding parts in all the views.

Figure 1 is a plan view of the apparatus at work, showing parts in section. Fig. 2 is a section on the line 2 2 of Fig. 1; and Fig. 3 is a view similar to Fig. 1, but showing a modification of my invention.

Referring to Fig. 1, $a$ indicates the tool, which is in the form of a disk with a V-shaped periphery, enabling it to give the glass the necessary incision. This disk-like tool $a$ is formed of a homogeneous substance sufficiently hard to grind away or remove portions of the glass. For instance, this tool may be made of a hard fine-grained wheel of the emery class, and said tool is mounted on a spindle $b$, which itself is suitably mounted and arranged to be driven at a high rate of speed. I have found two hundred and fifty revolutions per minute to be for all practical purposes the most effectual speed.

$c$ indicates the work, which in Fig. 1 is supposed to be the cylinder of a glass hypodermic syringe.

In practicing the invention the work is given a spiral movement along its axis—*i. e.*, a combined turning and longitudinal movement—causing the work to advance steadily simultaneously with the turning thereof. This advance or longitudinal movement of the work corresponds with the pitch of the thread to be formed, and as the tool is driven against the work the thread is cut, ground, or formed in the surface thereof. Various means may be employed for mounting and feeding the work. In Fig. 1 I have shown a yoke $d$, on which works a nut $e$, serving to compress the yoke around a bushing $f$, which receives the work, as shown. Said yoke $d$ is formed on or fastened to a feed-screw $g$, having a hand-wheel $h$ and mounted in a stationary feed-nut $i$. The yoke $d$ turns freely in a bearing $k$, and these parts $i$ and $k$ are mounted on a suitable base $l$, which in turn is carried on a compound lathe-rest. Now it is clear that by turning the hand-wheel $h$, through the coaction of the parts $g$ and $i$, the yoke $d$, and consequently the work $c$, will be given the before-described turning and advancing movement.

The form of the invention shown in Fig. 3 involves a simpler means for mounting and feeding the work. In this form of the invention $c'$ indicates the work. $l$ indicates a sleeve which is secured tightly within the tubular work. If desired, a bushing may be introduced between the sleeve and work, so as to prevent cracking the work. The said sleeve $l$ is internally threaded and screws on a feed-screw $m$, which is suitably mounted, preferably on a compound lathe-rest, as shown. The tool $a$ and spindle $b$ thereof are essentially the same as before described. In this form of the invention the work is fed by manually turning the work itself, and through the action of the parts $l$ and $m$ the work is given a simultaneous movement longitudinally of the feed-screw, this operation resulting in forming a thread on the glass, as before described.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. An apparatus for forming threads on glass, comprising a disk-shaped tool formed of a homogeneous material capable of grinding away or removing portions of the glass, means for revolubly driving said tool, and means for mounting the glasswork and for feeding the same against the tool with a combined turning and axial movement, whereby to form the thread in the work.

2. An apparatus for forming threads on glass, comprising a disk-shaped tool formed of a homogeneous material capable of grinding away or removing portions of the glass, means for mounting and revolubly driving the tool, a feed-nut, and a feed-screw, said nut and screw coacting and one of said parts being adapted to carry the work.

3. An apparatus for forming threads on glass, comprising a tool capable of grinding away or removing portions of the glass, a yoke for holding the work, a stationary feed-nut, and a feed-screw working therein and having connection with the yoke.

4. An apparatus for forming threads on glass, comprising a tool capable of grinding away or removing portions of the glass, a yoke for holding the work, a stationary feed-nut, a feed-screw working therein and having connection with the yoke, the said yoke comprising a contractible sleeve, a bushing set therein, and a clamping device working on the exterior of the sleeve.

In testimony whereof I have signed my name to this specification in the presence of two subscribing witnesses.

FREDERICK WACKENHUTH.

Witnesses:
    ISSAC B. OWENS,
    JNO. M. RITTER.